US012006192B1

(12) United States Patent
Brants et al.

(10) Patent No.: US 12,006,192 B1
(45) Date of Patent: Jun. 11, 2024

(54) POWERED COUNTERWEIGHT SYSTEM

(71) Applicant: Protech Theatrical Services, Inc., North Las Vegas, NV (US)

(72) Inventors: Will H. Brants, Las Vegas, NV (US); Matthew B. Boswell, North Las Vegas, NV (US)

(73) Assignee: Protech Theatrical Services, Inc., North Las Vegas, NV (US)

( * ) Notice: Subject to any disclaimer, the term of this patent is extended or adjusted under 35 U.S.C. 154(b) by 205 days.

(21) Appl. No.: 17/241,031

(22) Filed: Apr. 26, 2021

Related U.S. Application Data

(60) Provisional application No. 63/014,706, filed on Apr. 24, 2020.

(51) Int. Cl.
*B66D 3/20* (2006.01)
*A63J 1/02* (2006.01)
*B66D 3/26* (2006.01)

(52) U.S. Cl.
CPC ................ *B66D 3/20* (2013.01); *A63J 1/028* (2013.01); *B66D 3/26* (2013.01)

(58) Field of Classification Search
CPC ... B66D 1/20; B66D 1/56; B66D 1/58; B66D 1/60; B66D 1/72; B66D 3/16; B66D 3/20; B66D 3/24; B66D 3/26; A63J 1/02; A63J 1/028
USPC .................................................. 254/358, 385
See application file for complete search history.

(56) References Cited

U.S. PATENT DOCUMENTS

| | | | | |
|---|---|---|---|---|
| 1,027,027 A * | 5/1912 | Bailey | A63J 1/028 | 472/78 |
| 1,340,066 A * | 5/1920 | Lemle | A63J 1/028 | 49/140 |
| 1,692,142 A * | 11/1928 | Strauss | E01F 13/12 | 49/9 |
| 2,189,974 A * | 2/1940 | Buford | B61L 29/023 | 49/9 |
| 2,756,133 A * | 7/1956 | Butzin | B24B 47/20 | 74/99 R |
| 3,165,296 A * | 1/1965 | Drew | A63J 1/028 | 472/78 |
| 3,345,066 A * | 10/1967 | Izenour | A63J 1/028 | 472/78 |
| 3,861,520 A * | 1/1975 | Ballard | B21D 43/055 | 198/621.1 |
| 3,896,926 A * | 7/1975 | Cuniberti | B65G 47/907 | 198/750.12 |
| 4,058,294 A * | 11/1977 | Dressler | B66D 1/7415 | 254/378 |
| 4,165,863 A * | 8/1979 | Schreyer | B66D 3/26 | 294/82.16 |
| 5,996,970 A * | 12/1999 | Auerbach | B66D 1/60 | 472/78 |
| 7,275,733 B2 * | 10/2007 | Svitavsky | B66D 1/7405 | 254/358 |

(Continued)

FOREIGN PATENT DOCUMENTS

JP 2003117264 A * 4/2003

*Primary Examiner* — Michael R Mansen
*Assistant Examiner* — Henrix Soto
(74) *Attorney, Agent, or Firm* — Newman Law, LLC

(57) ABSTRACT

A power assisted counterweight-balanced rigging device for raising and lowering a load including a sealed arbor, a sprocket driven by a driven gear and laterally adjacent first and second idler gears.

1 Claim, 6 Drawing Sheets

(56) References Cited

U.S. PATENT DOCUMENTS

| | | | | |
|---|---|---|---|---|
| 8,596,616 | B1 * | 12/2013 | Soot | A63J 1/028<br>254/394 |
| 10,537,822 | B2 * | 1/2020 | Leclercq | A63J 1/02 |
| 2007/0227830 | A1 * | 10/2007 | Svitavsky | A63J 1/028<br>187/366 |

* cited by examiner

POWERED COUNTERWEIGHT SYSTEM

CROSS-REFERENCE TO RELATED APPLICATIONS

This application claims the priority benefit of U.S. Provisional Patent Application No. 63/014,706 filed Apr. 24, 2020, the disclosure of which is incorporated herein by reference.

BACKGROUND OF THE INVENTION

The invention is directed to the field of counterweight and counterweight control systems, and more specifically, to counterweight and counterweight control systems that are configured and advantageously adapted for use with theatrical scenery.

Most modern line set systems for use with theatrical scenery are counterweight systems in which the weight of the scenery is balanced by counterweights. Stage hands can manually lower and raise the scenery by pulling on a cord attached to the counterweight.

These manual set systems are designed to lift the scenery up from the stage where it can be seen by the audience into the storage area above the stage where it cannot be seen. Many stages built within the previous 120 years have such manual systems. Theatrical manual counterweight sets consist of a pipe batten to which theatrical scenery or lighting is attached, lift lines that connect the batten with a counterweight arbor while passing over blocks (sheaves) located high above the stage floor. The counterweight arbors are typically guided in tracks, a T-Bar, J-Bar or comparable design and move vertically adjacent to a stage sidewall. The counterweight arbor is moved by a closed loop operating line which connects to the arbor top, runs up and passes over the (head)block above the arbor, then continues down to a floorblock located below the lowest limit of arbor travel, passes around the floorblock and runs up to the bottom of the arbor. The set is typically operated from the stage floor, the operating line passes through a rope lock mounted to the operating rail. The rope lock compresses the operating line and prevents unintended movement of the set under normal instances. The counterweight arbor is designed to hold a stack of steel weights which are cast or machined to mount in the counterweight frame and be restrained so they do not shift or come out of the counterweight arbor frame during normal use. These weights nominally weight 20 or 30 pounds. When installed, the counterweight arbor is fitted with several weights that counterbalance the weight of the pipe batten. These weights are marked so that they remain in place when the set is not being used. When scenery or lighting is attached to the batten, additional weights are added to offset (balance) the load on the batten. The goal is to balance the scenery and arbor weights so that the unbalance load the operator has to restrain is 20-30 pounds. In actual practice the unbalance weight changes due to the weight shift of the lift lines as the batten moves from the lowest trim to the highest trim. Some sets with long battens and large travel distances need to be fitted with compensation cables that counterbalance the weight shift of the lift lines.

The manual counterweight set has several disadvantages. First, it requires a well-trained crew of several able-bodied individuals to use. There is considerable physical labor involved in adding and removing the steel counterweights from the arbor (often as much as a half-ton or more) each time scenery is added or removed. In addition, since there is an unbalance in the set and friction in the blocks, physical strength is needed to operate the set, both to get the set moving then to overcome the inertia and bring the batten to a stop, especially if high speeds are involved. Continuous safety monitoring and training are needed to prevent unsafe conditions from developing and causing accidents. A set that is allowed to become unbalanced by several hundred pounds can run away, causing the counterweight arbor to rapidly rise or fall uncontrolled. When the arbor comes to an abrupt stop at the limit of its travel, it can become damaged and weights can become dislodged. The resulting condition creates another imbalance causing a run-away in the opposite direction. If the arbor rises and strikes the top limit, it is very likely that several 20 or 30 pound steel weights will fall to the floor doing great damage and potentially being deadly.

Accordingly, there is a need in the art for improved counterweight systems for at least the foregoing reasons.

SUMMARY OF THE INVENTION

The invention is generally directed to a novel counterweight rigging and counterweight control system that solves at least some if not all of the issues cited above, among other issues in the art.

Some embodiments of the invention are directed to a control system that is automated, including a power assisted counterweight-balanced rigging device for raising and lowering a load of predetermined weight, comprising a winch; a sealed arbor having counterweights thereon, wherein the sealed arbor includes and upper end and a lower end; a driven gear engaged with a sprocket, wherein the sprocket is driven to rotational motion by the engagement with the driven gear; first and second idlers gears being laterally adjacent the sprocket, wherein a drive chain is engaged by the sprocket and the idler gears, the drive chain having first and second ends; first and second spring-biased connectors mounted on the first and second ends of the drive chain, wherein the first and second spring biased connectors are mounted on the upper end of the sealed arbor and the lower end of the sealed arbor respectively; first and second elongated guard rails extending parallel to the drive chain; and a braking bar configured to interlock with the sprocket and prevent rotational motion of the sprocket responsive to the sprocket having achieved a preset upper limit of rotational motion.

Some embodiments of the invention are directed to a power assisted counterweight-balanced rigging device for raising and lowering a load of predetermined weight, comprising: a sealed arbor having counterweights thereon, wherein the sealed arbor includes and upper end and a lower end; a driven gear engaged with a sprocket, wherein the sprocket is driven to rotational motion by the engagement with the driven gear; first and second idlers gears being laterally adjacent the sprocket, wherein a drive chain is engaged by the sprocket and the idler gears, the drive chain having first and second ends; first and second spring-biased connectors mounted on the first and second ends of the drive chain, wherein the first and second spring biased connectors are mounted on the upper end of the sealed arbor and the lower end of the sealed arbor respectively; first and second elongated guard rails extending parallel to the drive chain; and a braking bar configured to interlock with the sprocket and prevent rotational motion of the sprocket responsive to the sprocket having achieved a preset upper limit of rotational motion.

The aforementioned device may further comprise a remote control panel for presetting movement of the drive chain.

In some embodiments, the first end of the drive chain is routed over an upper pulley before being connected to the upper end of the arbor.

Other embodiments, features and advantages of the invention will be readily appreciated and apparent from the following detailed description when considered in connection with the accompanying drawings.

BRIEF DESCRIPTION OF DRAWINGS

While the disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION OF SOME EMBODIMENTS OF THE INVENTION

In the following description of the preferred embodiment, reference is made to the accompanying drawing that form a part hereof, and in which is shown by way of illustration specific embodiments in which the invention may be practiced. It is to be understood that other embodiments may be utilized and that changes may be made without departing from the scope of the invention. It should be further understood that components in the figures are not necessarily to scale, and certain components are included, displayed and made part of this disclosure, but not specifically discussed herein with reference to the drawings, emphasis instead being placed upon illustrating the principles of the invention. Reference will now be made in detail to the presently preferred embodiments of the invention, examples of which are illustrated in the accompanying drawing.

Figure 1:
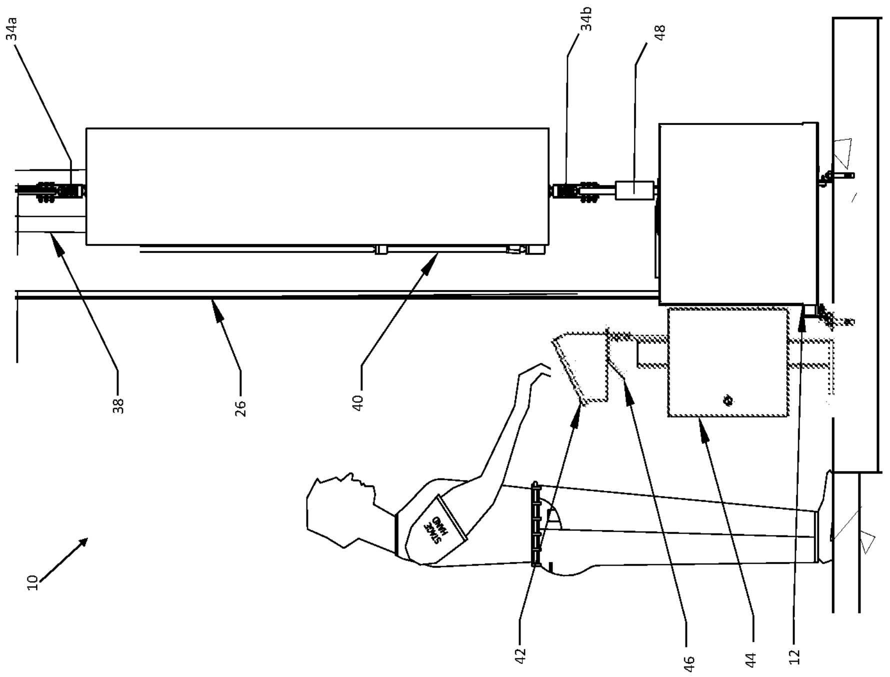
FIG. 1 is a schematic of an embodiment of the invention installed in a theater.
Figure 2:
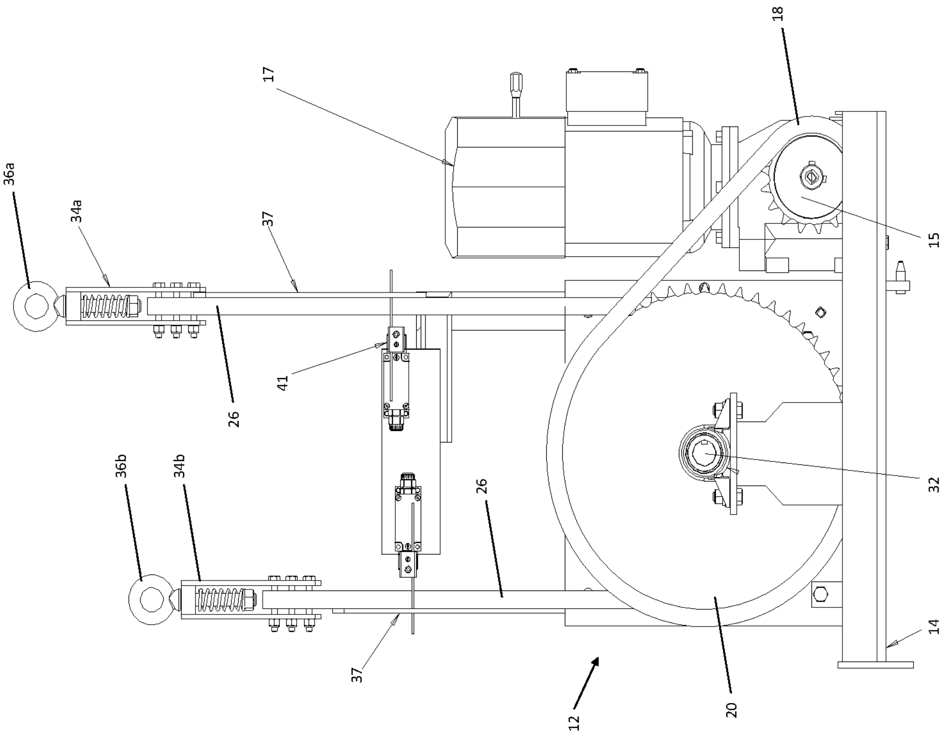
FIG. 2 is a detailed side view of the winch module of the invention in which the housing cover is removed.
Figure 3:
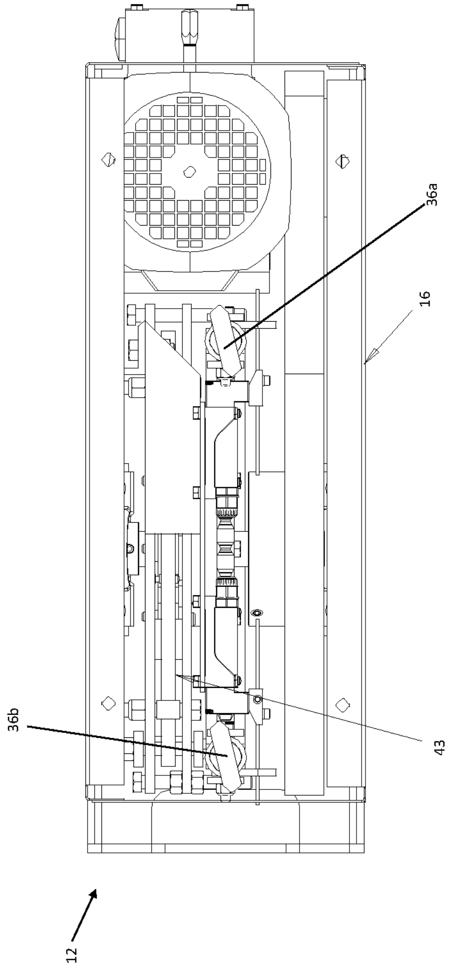
FIG. 3 is a detailed top view of the module shown in FIG. 2.
Figure 4:
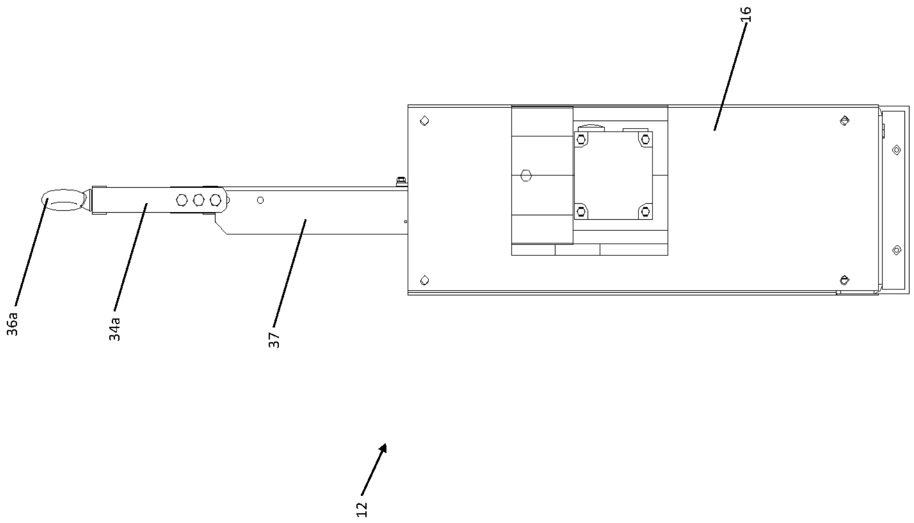
FIG. 4 is a front view of the module shown in FIG. 2 with the housing.
Figure 5:
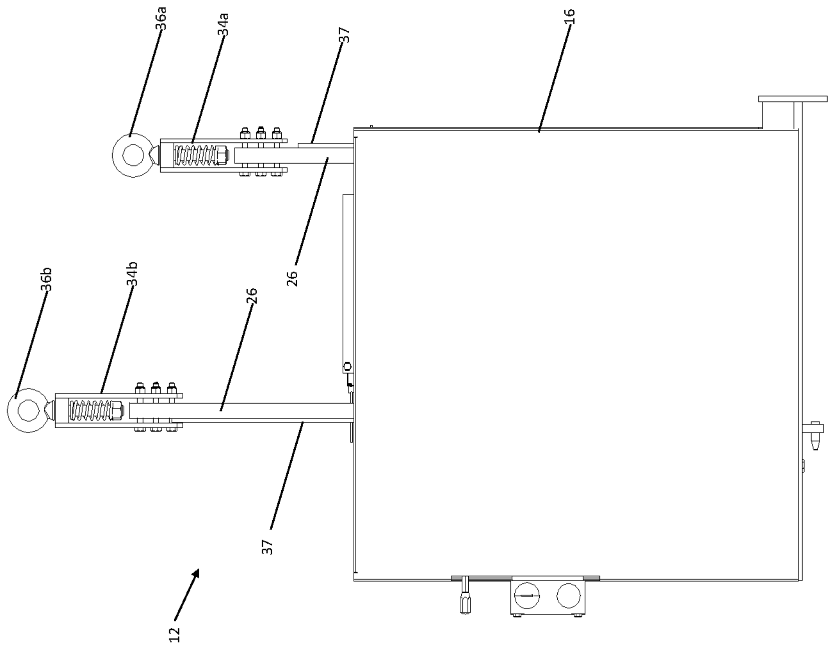
FIG. 5 is a side view of the module shown in FIG. 2 with the housing.
Figure 6:
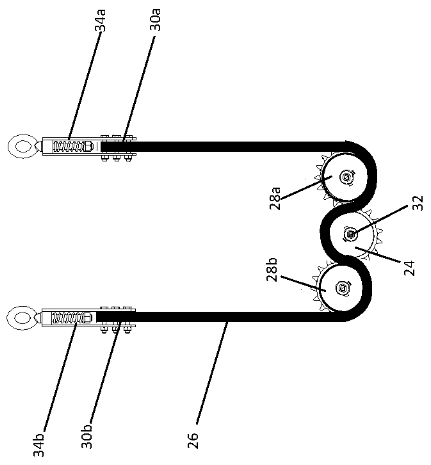
FIG. 6 is an elevation view of the drive chain and certain gears of the embodiment of the invention shown in FIG. 1.

FIGS. 1-6 illustrates an exemplary embodiment of a counterweight rigging system of the invention referred to herein by the reference numeral 10. System 10 is a closed loop counter-weight assist winch which generally comprises one or more modules that, among other things, add power assist and electronic position control to the typical manual counterweight sets found in theater stages.

System 10, also referred to herein as "CounterMate", includes an electro-mechanical power module (EMPM) 12 mounted on a base 14. Likewise, module 12, including housing 16, may be dimensioned to fit within the space accommodations of existing counterweight systems.

For example, module 12 may be compact and sized to fit within the space that remains after selected components of a prior counterweight rigging system are removed. In a typical installation a plurality of counterweight rigging systems is installed in parallel fashion to allow the raising and lowering of a plurality of battens. Normally, such systems are installed compactly, with approximately six to eight inches between adjacent systems. EMPM 12 is dimensioned such that base 14 can fit within a preset footprint, such as for example, the aforementioned eight inch space. Though EMPM 12 is described herein as being located on the floor it should be understood that system 10 and any of its components, such as EMPM 12, could be located at other possible locations.

With housing 16 removed, the interior components of module 12 can be viewed as including a drive gear 15 driven by motor 17 connected by a drive chain 18 with a driven gear 20. The opposing side of driven gear 20 includes sprocket 24 which is mounted on a unitary axle 32 with driven gear 20. A drive chain 26 is engaged with sprocket 24 and is routed around idler gears 28*a* and 28*b* which are mounted in laterally adjacent to sprocket 24.

Idler gears 28*a*, 28*b* position drive chain 26 so that each opposing end 30*a*, 30*b* thereof is routed from the module 12 in parallel and generally vertical paths, laterally separated by a distance approximately equal to the diameter of a head block or pulley wheel (not shown) used to connect with arbor 40. Opposing ends 30*a*, 30*b* of drive chain 26 each includes a spring-loaded tensioner 34*a,b* with linking members 36*a,b*. This embodiment includes safety guard rails 37 adjacent to the exposed portions of drive chain 26, that is, the portions of drive chain 26 that extend outside of housing 16. Guard rails 37 are substantially elongated vertical extensions mounted on housing 16.

Linking members 36*a,b* may connect with existing lines (not shown) or drive chain 26 routed about a head block or pulley (not shown) and engaged with a counterweight arbor 40 at upper and lower ends to raise and lower arbor 40 responsive to rotational motion of the drive gear 15, drive chain 18, driven gear 20, sprocket 24 and idler gears 28*a,b*.

Motor 17 may include a motor, gear reducer, and mechanism to drive drive gear 15 (serpentine rollers, sprocket wheel, etc.), a limit switch 41 to control the limits of travel and a starter or variable speed drive. In this embodiment, motor 17 may incorporate multiple speeds and include a bidirectional overspeed braking or speed reduction mechanism. An overspeed brake bar 43 is positioned to pivot or otherwise move into a position by which brake bar 43 interlocks with driven gear 20 and sprocket 24 to reduce and stop rotational motion responsive to rotational motion indicative of potentially dangerously fast movement of the load.

Drive chain 26 may be formed of rope or a roller chain or any flexible medium with the ability to be positively driven by system 10. In some embodiments, drive chain 26 is formed of a roller chain with linking members 36*a,b* being connected to existing lines, which may be rope, routed about the head block. Tensioners 34*a,b* help to facilitate a positive and smooth drive of existing lines without slipping.

In some embodiments, arbor 40 is sealed, whereas in other embodiments system 10 is used to replace existing manual, automated or power assist counterweight systems. It should be understood that arbor 40 may be a predetermined weight, such as a percentage of the maximum weight capacity of otherwise related to the load (such as scenery, lighting, curtains, sound equipment, and the like, which may be connected by lift lines 38 to arbor 40) to be raised and lowered.

Systems of the invention can be constructed and configured as retro-fitting systems to existing manual counterweight system. An exemplary installation of a CounterMate system comprising the one or more modules according to the invention may involve replacing the floor block with the CounterMate Electro-Mechanical Power Module (EMPM) 12 and replacing the manual operating line with a cable and roller chain assembly as disclosed herein, such that a first end of drive chain 26 is routed through the head block or pulley and attached to the arbor on the upper end while the second end of drive chain is connected to the arbor on the lower end. The rope lock would be removed and replaced by the Operator Control Module (OCM) 42. The third module, the Electrical Power Module (EPM) 44, normally mounts to the electro-mechanical power module below the operating rail 46. It is physically possible to combine the EPM 44 and the OCM 42 in situations where having just two modules is advantageous. The EMPM module 12 may also be configured to fit within a desired space to accommodate different configurations of manual set systems.

An exemplary electro-mechanical power module 12 of the invention may contain various components, such as the motor that powers the set, brake, absolute or incremental position sensor, load sensors, and ultimate limits. In the embodiment shown, an ultimate limit actuator or spike 48 is disposed on drive chain 26 adjacent to tensioner 34*b*, which may facilitate preset positioning of the load, among other things. After installation of the electro-mechanical power module and the roller chain assembly, weights are added to the counterweight arbor equaling about half the power unit's capacity. The weights may be secured, permanently or otherwise, so they cannot be dislodged, additionally, the arbor would be made to, among other things, prevent additional weights from being added to the arbor. This allows the power unit to move any scenery or lighting load attached to the batten up to the maximum rated load capacity.

The invention may also include an interface or HMI (Human Machine Interface) in communication with various system components to enable an operator of the system of the invention to apply power, run the set up or down or to select one of a plurality of position presets (which may be three) programmed by the operator, among other things. The HMI may be part of OCM 42 and include a display or touchscreen, and may be operative from a remote device or through a downloadable app.

Electrical power module or EPM 44 contains the Programmable Logic Controller (PLC) which receives commands from the HMI operator's module, the ultimate limits, instantaneous load information, and position data. The EPM then outputs control signals to the Variable Frequency Drive (VFD) while also monitoring everything to ensure safe operation. Faults, overloads, and similar issues are displayed on the HMI screen so that the operator may take appropriate action. In some embodiments, the VFD connects to normal, single or multi-phase, 120, 240, 230 or 480 volt power and outputs controlled three phase power to the motor while ensuring the motor operates within safe limits.

Those skilled in the art will readily appreciate that the OCM 42 and HMI described herein may include various computer and network related software and hardware, such as programs, operating systems, memory storage devices, data input/output devices, data processors, servers with links to data communication systems, data communication devices, Bluetooth, wireless or otherwise, which may be specific and specialized for the purposes described herein and for other purposes, such as maintaining a secure operating environment or for facilitating a theatrical production.

In addition, the system of the invention may include sensing or monitoring systems which provide load cell detection of overload on winch and load cell monitoring on both chains connected to counterweight top and bottom. The system of the invention may be configured to monitor for dangerous system overload and correct tension in the drive chain.

Embodiments of the invention may include one or more position sensors, such as absolute or incremental sensors, to provide greater reliability and fault tolerance, and specialized spikes attached to the roller chain for ultimate limits.

In some embodiments, the system advantageously distributes controls by including self-contained modules and units, in which a failure of one unit does not prevent other units from operating. Control modules may be configured to be interchangeable between mechanical and/or motorized components so that electronics failures are correctable quickly by substituting a like module from spares or another set.

Among the benefits of the invention, systems of the invention mitigate the disadvantages of the manual counterweight set in at least the following example ways: a single operator can do the work of the 4 or 5 person crew required to safely load or unload a manual set. For the first time being a flyman and operating the counterweight sets as they were intended to be is now an ADA compliant operation; the operator no longer must have the physical strength required of the manual crew members; there is no intensive labor of moving tons of steel weights that would often be required when using manual set; safety is greatly improved, as sensors and monitoring devices of the invention detect unsafe conditions and prevent operation while alerting the operator; and the requirement for rigorous training and strict observance of safety protocols and manual checks is greatly reduced at least because human error or omission of a safety check is unlikely to result in a run-away set.

Theatrical rigging counterweight systems of the invention, such as CounterMate, thus provide great advantages over the state of the art.

While exemplary apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth herein, and in the claims, and any equivalents thereto.

The invention claimed is:

1. A power assisted counterweight-balanced rigging device for raising and lowering a load of predetermined weight, comprising:

a sealed arbor having counterweights thereon, wherein the sealed arbor includes an upper end and a lower end;

a housing;

a sprocket mounted in the housing;

a driven gear mounted in the housing and engaged with the sprocket, wherein the sprocket is driven to rotational motion by the engagement with the driven gear;

first and second idler gears mounted in the housing, a first idler gear of the first and second idler gears being mounted in the housing at a first laterally adjacent position relative to a first side of the sprocket, a second idler gear of the first and second idler gears being mounted at a second laterally adjacent position relative to a second side of the sprocket, the first side of the sprocket laterally opposing the second side of the sprocket, wherein the first idler gear mounted at the first laterally adjacent position relative to the first side of the sprocket and the second idler gear mounted at the second laterally adjacent position relative to the second side of the sprocket are each mounted on laterally opposing sides of the sprocket, the mounting of the first and second idler gears defining a first idler gear proximal side laterally adjacent to the first side of the sprocket, a first idler gear distal side laterally opposing the first idler gear proximal side, a second idler gear proximal side laterally adjacent to the second side of the sprocket and a second idler gear distal side laterally opposing the second idler gear proximal side;

a drive chain extending through the housing defining first and second opposing portions of the drive chain extending from the housing and a portion of the drive chain positioned between the first and second opposing portions, the portion of the drive chain positioned between the first and second opposing portions including an engaged portion within the housing, the first and second opposing portions of the drive chain extending from the housing, wherein the engaged portion of the drive chain within the housing is engaged by each of the sprocket and the first and second idler gears, the engaged portion including the first and second opposing sides of the sprocket, the first idler gear proximal side, the first idler gear distal side, the second idler gear proximal side and the second idler gear distal side, the first and second opposing portions of the drive chain extending from the housing having first and second ends, respectively, wherein the first and second idler gears mounted in the housing are mounted in the first and second laterally adjacent positions on the laterally opposing first and second sides of the sprocket and respectively from the first idler gear distal side and the second idler gear distal side whereby the first and second opposing portions of the drive chain extending longitudinally from the housing are routed from an exterior wall of the housing in parallel and vertical paths from the first idler gear distal side and the second idler gear distal side of the first and second idler gears, the parallel and vertical paths of the first and second opposing portions being laterally separated from one another by about the same distance as the distance between the first idler gear distal side and the second idler gear distal side;

first and second spring-biased connectors mounted on the first and second ends of the drive chain, wherein the first and second spring biased connectors are mounted on the upper end of the sealed arbor and the lower end of the sealed arbor respectively; and first and second elongated guard rails mounted on the exterior wall of the housing and extending vertically from the exterior wall of the housing, the first and second elongated guard rails being positioned parallel to one another and adjacent the paths of the first and second opposing portions of the drive chain.

* * * * *